United States Patent
Liang et al.

(10) Patent No.: US 11,298,921 B2
(45) Date of Patent: Apr. 12, 2022

(54) GLASS ARTICLE HAVING COATING WITH INTERPENETRATING POLYMER NETWORK

(71) Applicant: GUARDIAN GLASS, LLC., Auburn Hills, MI (US)

(72) Inventors: Liang Liang, Taylor, MI (US); Suresh Kumar Devisetti, New Hudson, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 883 days.

(21) Appl. No.: 14/956,559

(22) Filed: Dec. 2, 2015

(65) Prior Publication Data
US 2017/0158553 A1   Jun. 8, 2017

(51) Int. Cl.
*B32B 27/08*   (2006.01)

(52) U.S. Cl.
CPC .................... *B32B 27/08* (2013.01)

(58) Field of Classification Search
CPC ..... C03C 17/007; C03C 17/009; C03C 17/04; C03C 17/30; C03C 17/32; C03C 17/322; C03C 17/326; C03C 2217/29; C03C 2217/445; C03C 2217/47; C03C 2217/70; C03C 2217/73; C03C 2218/11; B32B 27/08
See application file for complete search history.

(56) References Cited

U.S. PATENT DOCUMENTS

| | | | | | |
|---|---|---|---|---|---|
| 5,269,840 | A | * | 12/1993 | Morris | C09C 3/045 106/400 |
| 5,332,767 | A | * | 7/1994 | Reisser | C08F 292/00 428/403 |
| 6,030,671 | A | * | 2/2000 | Yang | B32B 17/10009 359/354 |
| 6,147,156 | A | * | 11/2000 | Yamaya | C08F 283/12 524/588 |
| 8,816,012 | B2 | | 8/2014 | Brown et al. | |
| 2002/0122946 | A1 | * | 9/2002 | Kuck | C08G 77/20 428/447 |
| 2006/0014898 | A1 | | 1/2006 | Kim | |
| 2006/0148985 | A1 | * | 7/2006 | Karthauser | C08F 283/12 525/100 |

(Continued)

FOREIGN PATENT DOCUMENTS

| | | |
|---|---|---|
| DE | 3909565 | 9/1990 |
| DE | 3909656 A1 | 9/1990 |

(Continued)

OTHER PUBLICATIONS

International Search Report and Written Opinion for PCT/US2016/064324 dated Feb. 14, 2017, 11 pages.

*Primary Examiner* — Michael B Nelson

(57) ABSTRACT

A glass article includes a glass substrate and a coating disposed on the glass substrate. The coating includes a glass frit material and a binder material. The binder material includes a first polymer that has cross-linked first polymer chains and a second polymer that has second polymer chains that are linear, branched, or cross-linked. The cross-linked first polymer chains and the second polymer chains form an interpenetrating network in which the second polymer chains are intertwined on a molecular scale with the cross-linked first polymer chains.

17 Claims, 4 Drawing Sheets

(56) References Cited

U.S. PATENT DOCUMENTS

| | | |
|---|---|---|
| 2007/0138659 A1 | 6/2007 | Konno |
| 2009/0266015 A1* | 10/2009 | Schield ............ B32B 17/10045 |
| | | 52/204.62 |
| 2010/0330308 A1 | 12/2010 | Cooper et al. |

FOREIGN PATENT DOCUMENTS

| | | |
|---|---|---|
| EA | 021529 B1 | 7/2015 |
| EP | 10778925 B1 | 9/2012 |
| GB | 721858 | 1/1955 |
| RU | 2013100655 A | 7/2014 |
| SU | 298617 A1 | 3/1971 |
| WO | 2012004337 A1 | 1/2012 |

\* cited by examiner

GLASS ARTICLE HAVING COATING WITH INTERPENETRATING POLYMER NETWORK

BACKGROUND

Translucent glass is used in buildings, furniture, and many other structures. There are several techniques for fabricating translucent glass. One such technique includes roughening the surface of the glass by acid etching, grinding, polishing, sand-blasting, or the like. Acid etching with hydrofluoric acid is a preferred method for achieving good optical performance of translucent glass, and the glass can be tempered after the acid etching. However, a significant drawback of acid etching is the handling and disposal of the acid.

Another technique for fabricating translucent glass involves the formation of a translucent enamel coating on the glass. The coating is formed by depositing a glass frit on the surface of the glass. The frit may be in a mixture with a carrier medium and a binder, which is typically a linear polymer. The mixture is thermally treated to remove the carrier medium, leaving an "intermediate" or "green" coating of the binder and frit on the surface of the glass. A further thermal treatment then removes the binder and sinters the frit to form the final translucent enamel coating on the glass.

SUMMARY

A glass article according to an example of the present disclosure includes a glass substrate, and a coating disposed on the glass substrate. The coating includes a glass frit material and a binder material. The binder material includes a first polymer that has cross-linked first polymer chains and a second polymer that has second polymer chains that are linear, branched, or cross-linked. The cross-linked first polymer chains and the second polymer chains form an interpenetrating network in which the second polymer chains are intertwined on a molecular scale with the cross-linked first polymer chains.

In a further embodiment of any of the foregoing embodiments, the first polymer includes a carbon-backbone polymer and the second polymer includes a silicon-backbone polymer.

In a further embodiment of any of the foregoing embodiments, the silicon-backbone polymer includes polysiloxane.

In a further embodiment of any of the foregoing embodiments, the carbon-backbone polymer includes a thermoset polymer.

In a further embodiment of any of the foregoing embodiments, the carbon-backbone polymer includes polyurethane or epoxy.

In a further embodiment of any of the foregoing embodiments, the silicon-backbone polymer includes polysilsesquioxane.

In a further embodiment of any of the foregoing embodiments, the second polymer chains are cross-linked.

In a further embodiment of any of the foregoing embodiments, the coating further comprises a third polymer having third polymer chains that are either linear, branched, or cross-linked, and the third polymer chains are also intertwined on a molecular scale in the interpenetrating network with the cross-linked first polymer chains.

In a further embodiment of any of the foregoing embodiments, the third polymer includes a thermoset polymer.

In a further embodiment of any of the foregoing embodiments, relative to a total weight of the coating. The coating includes less than 11% of the binder material.

In a further embodiment of any of the foregoing embodiments, the coating further comprises nanoparticles.

In a further embodiment of any of the foregoing embodiments, the nanoparticles include silicon-containing nanoparticles, and relative to a total weight of the coating.

In a further embodiment of any of the foregoing embodiments, the coating includes 0.5% to 5% of the silicon-containing nanoparticles and less than 11% of the binder material inclusive of the silicon-containing nanoparticles.

In a further embodiment of any of the foregoing embodiments, the silicon-containing nanoparticles are chemically bonded with at least one of the first polymer chains or the second polymer chains.

In a further embodiment of any of the foregoing embodiments, the nanoparticles include titanium-containing nanoparticles.

A further embodiment of any of the foregoing embodiments includes a substantially glass frit-free polymeric layer disposed on the coating.

In a further embodiment of any of the foregoing embodiments, the coating further comprises a pigment.

In a further embodiment of any of the foregoing embodiments, the glass substrate includes a low-E coating.

A glass article according to an example of the present disclosure includes glass substrate, and a coating disposed on the glass substrate. The coating includes a glass frit material and, by weight, less than 11% of a binder material that includes a first polymer and a second polymer. The coating has a cross-hatch adhesion of greater than or equal to 3 B (ASTM: D3359-09), a stud pull strength of greater than or equal to 450 pounds per square inch (ASTM: D4435-84), a Hoffman hardness of greater than 10 (GE: E50TF65), and a methyl-ethyl-ketone rub resistance of greater than 100 strokes (ASTM: D4752).

In a further embodiment of any of the foregoing embodiments, the first polymer and the second polymer are different polymers selected from the group consisting of carbon-backbone polymers and silicon-backbone polymers.

In a further embodiment of any of the foregoing embodiments, the first polymer is the carbon-backbone polymer.

In a further embodiment of any of the foregoing embodiments, the second polymer is the silicon-backbone polymer.

In a further embodiment of any of the foregoing embodiments, the carbon-backbone polymer includes a thermoset polymer.

In a further embodiment of any of the foregoing embodiments, the silicon-backbone polymer includes polysiloxane.

In a further embodiment of any of the foregoing embodiments, the first polymer includes cross-linked first polymer chains and the second polymer includes second polymer chains that are linear, branched, or cross-linked, and the first polymer chains and the second polymer chains form an interpenetrating network in which the second polymer chains are intertwined on a molecular scale with the cross-linked first polymer chains.

In a further embodiment of any of the foregoing embodiments, the binder material of the coating further comprises silicon-containing nanoparticles that are chemically bonded with at least one of the first polymer or the second polymer.

A method of forming a coating for a glass article according to an example of the present disclosure includes applying a liquid coating material onto a glass substrate. The liquid coating material includes a carrier liquid, a glass frit material, and a binder material. At least a portion of the carrier liquid is removed and the binder material reacts to form a coating on the glass substrate. The coating includes the glass frit material, a first polymer having cross-linked first polymer chains, and a second polymer having second polymer chains that are linear, branched, or cross-linked. The reacting of the binder material produces an interpenetrating network in which the second polymer chains are intertwined on a molecular scale with the cross-linked first polymer chains.

In a further embodiment of any of the foregoing embodiments, the removing and the reacting proceed concurrently by heating the liquid coating material while on the glass substrate.

In a further embodiment of any of the foregoing embodiments, the liquid coating material includes a polymer latex.

In a further embodiment of any of the foregoing embodiments, the carrier liquid is water.

BRIEF DESCRIPTION OF THE DRAWINGS

The various features and advantages of the present disclosure will become apparent to those skilled in the art from the detailed description below. The drawings that accompany the detailed description can be briefly described as follows. The relative dimensions or sizes of the features in the drawings may be exaggerated for the purpose of description and are not necessarily shown to scale.

DETAILED DESCRIPTION

Figure 1A:
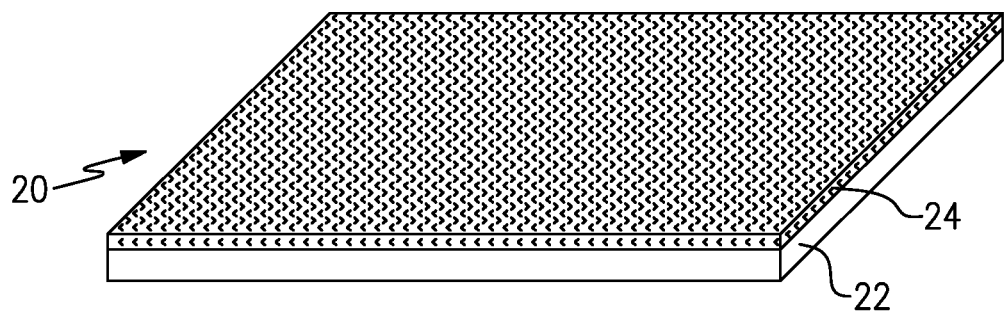
FIG. 1A is a perspective view of an example of a glass article that has a coating with an interpenetrating polymer network.
Figure 1B:
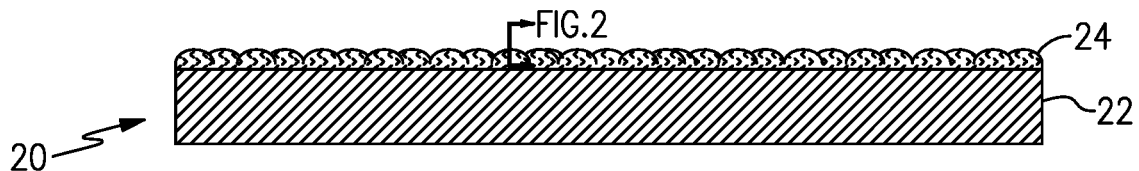
FIG. 1B is a sectioned view of the glass article of FIG. 1A.

FIG. 1A is a perspective view of an example glass article 20 that is temperable, and FIG. 1B is a sectioned view of the glass article 20. The glass article 20 includes a glass substrate 22 and a coating 24 disposed on the glass substrate 22. The coating 24 is an "intermediate" or "green" coating that can later be thermally treated in a tempering process to transform the coating 24 into a translucent enamel coating and temper the glass substrate 22.

As will be appreciated from this disclosure, the coating 24 has good strength, good adhesion to the glass substrate 22, and good chemical resistance. In this regard, there is lower potential for the coating 24 to be mechanically and/or chemically damaged during handling prior to the thermal treatment tempering process to form the translucent enamel coating. For example, the glass article 20 may be handled in connection with transport between facilities and in connection with downstream processing steps, such as cutting procedures. During the handling and/or cutting procedures, the glass article 20 may also be exposed to potentially damaging chemicals. For example, such chemicals can include cutting fluids or even environmental moisture.

Figure 2:
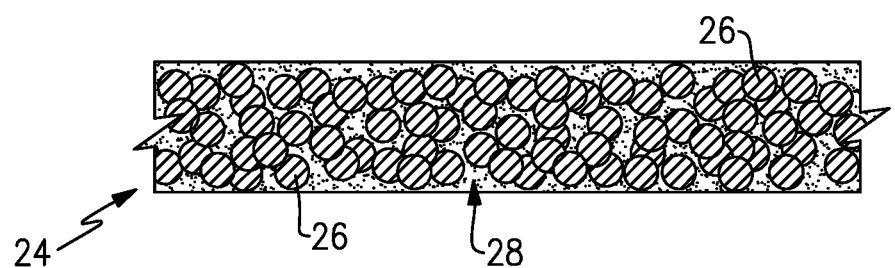
FIG. 2 is a sectioned view of an example coating for a glass article.

FIG. 2 illustrates a sectioned view of the coating 24. The coating 24 includes a glass frit material 26 and a binder material 28. The binder material 28 serves to bond the glass frit material 26 together and to the glass substrate 22. In the illustrated example, the coating 24 is a relatively uniform-thickness layer that is disposed directly on, and in contact with, a surface of the glass substrate 22. The surface of the glass substrate 22 may be conditioned or treated prior to formation of the coating 24, to remove foreign substances and enhance adhesion. Alternatively, a primer or other bonding layer could be provided on the glass surface for adhesion with the coating 24.

The coating 24 may have a thickness of less than approximately 80 micrometers, and more typically may have a thickness in a range of 50 micrometers to 80 micrometers. The thickness of the final translucent enamel coating may be approximately 40 to 70 micrometers, but this thickness will depend on the selected composition and thickness of the coating 24.

The coating 24 may alternatively vary in thickness for aesthetic and/or optical effect purposes. Additionally, the coating 24 may fully cover at least one complete surface of the glass substrate 22 or substantially fully cover at least one complete surface of the glass substrate 22. Typically, that surface will be an exterior surface, such as an exterior surface of a multi-pane insulated glass, although the location of the coating 24 is not limited. The coating 24 may alternatively cover only selected portions of a surface of the glass substrate 22, with other selected portions not having the coating 24.

The glass frit material 26 that ultimately forms the final translucent enamel coating is generally a glass particulate in the coating 24. The composition of the glass frit material 26 can be tailored to closely match thermal expansion properties of the glass substrate 22. For example, the composition is selected such that the coefficient of thermal expansion of the glass frit material 26 closely matches the coefficient of thermal expansion of the glass substrate 22, to enhance durability of the final translucent enamel coating.

The composition of the glass frit material 26 can also be tailored with respect to the later tempering process. In order to sinter and consolidate the glass frit material 26 to form the final translucent enamel coating, it is desirable that the glass frit material 26 melt during the tempering process. Thus, the composition of the glass frit material can also be tailored with respect to a temperature used for downstream tempering process. Generally, the composition of the glass frit material 26 is controlled such that the melt temperature is less than 650° C., but more typically the melt temperature may be approximately 550° C. In one example, the glass frit material 26 is a silica-based glass that includes zinc oxide as a melting point suppressant. In a further example, the glass frit material 26 has a composition as set forth in Table 1 below. The listed constituents may vary by +/−10% of the listed values. For example, a value of 2 could vary by +/−0.2.

TABLE 1

Glass Frit Composition

| Cotistituent | wt. % |
|---|---|
| F | 2 |
| $Na_2O$ | 21.4 |
| $Al_2O_3$ | 7.8 |
| $SiO_2$ | 39.8 |
| $TiO_2$ | 3.8 |
| ZnO | 25.8 |

Figure 3:
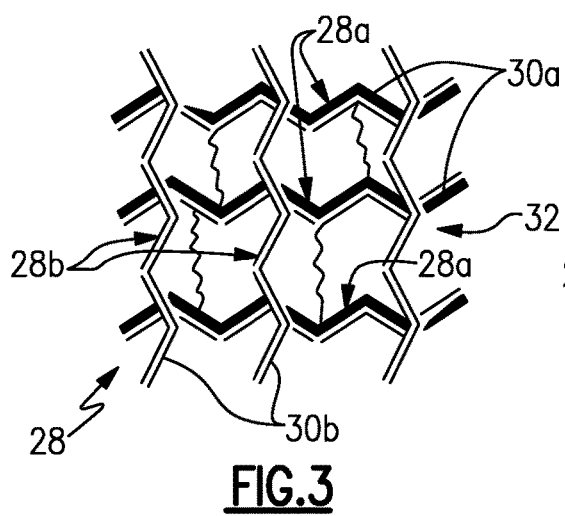
FIG. 3 is a molecular view of a binder material that has a binary polymer network.

FIG. 3 illustrates a molecular view of a representative portion of the binder material 28. In this example, the binder material 28 includes a first polymer 28a that has cross-linked first polymer chains 30a and a second polymer 28b that has second polymer chains 30b. The second polymer chains 30b can be linear, branched, or cross-linked chains. The first polymer chains 30a and the second polymer chains 30b form an interpenetrating network 32 in which the second polymer chains 30b are intertwined on a molecular scale with the first polymer chains 30a. The interpenetrating network 32 contributes to the good strength and chemical-resistance of the coating 24 in comparison to binders that do not include such an interpenetrating network.

The interpenetrating network 32 can be a fully-interpenetrating network or a semi-interpenetrating network, depending on the type of the second polymer chains 30b with respect to being linear, branched, or cross-linked. The interpenetrating network 32 is semi-interpenetrating for linear or branched types of the second polymer chains 30b, wherein the linear or branched second polymer chains 30b penetrate through the spaces between the cross-linked first polymer chains 30a. The interpenetrating network 32 is fully-interpenetrating for cross-linked types of the second polymer chains 30b, wherein the cross-linked second polymer chains 30b penetrate through the spaces between the cross-linked first polymer chains 30a and interlock with the cross-linked first polymer chains 30a such that the polymer chains 30a/30b could not be separated without breaking chemical bonds.

The chemical compositions of the first polymer 28a and the second polymer 28b are different and can be selected to enhance and tailor the strength, adhesion, and chemical resistance of the coating 24. For example, the first polymer 28a includes a cross-linked carbon-backbone polymer and the second polymer 28b includes a silicon-backbone polymer or a different carbon-backbone polymer that can be linear, branched, or cross-linked.

An example class of carbon-backbone polymers that can be used for the first polymer 28a and the second polymer 28b includes thermoset polymers. Although not limited, polyurethane and epoxy thermoset polymers can provide good strength and chemical resistance.

An example class of silicon-backbone polymers that can be used for the second polymer 28b includes polysiloxane. Again, although not limited, one example polysiloxane that can provide good strength, adhesion, and chemical resistance includes polysilsesquioxane.

An example class of non-crosslinked carbon-backbone polymers that can be used for the second polymer 28b includes linear or branched polymers. The linear or branched polymer can include, but is not limited to, polymethacrylonitrile, poly(alpha-methylstyrene), polyoxymethylene, polytetrafluoroethylene, poly(methyl atropate), poly p-bromostyrene, poly p-chlrostyerne, poly p-methyoxystyrene, poly p-methylstyrene, poly a-deuterostyrene, poly α,β, β-trifluorostyrene, polypropylene carbonate, polyethylene carbonate, polyethylene glycol-b-propylene, glycol-b-ethylene glycol, polyethylene glycol, and polymethyl methacrylate-co-polyacrylic acid and their copolymers. Additionally, the linear or branched polymer may be synthesized by free radical, living, or condensation polymerization with random, graft, star, or block structure. In further examples, the linear or branched polymer may have a molecular weight (Mw) of approximately 10,000 g/mol to approximately 300,000 g/mol. The above example polymers may also facilitate clean removal during the later heat treatment tempering process. Such polymers thermally decompose into relatively small molecular fragments that can more easily volatilize to gas for clean removal.

In further examples, the first polymer 28a is a cross-linked carbon-backbone polymer, the second polymer 28b is a linear or branched polymer, and the coating 24 includes approximately 70% to approximately 95% of the second polymer 28b, relative to the total weight of the first polymer 28a and the second polymer 28b. More typically, the coating 24 may include approximately 80% to approximately 90% of the second polymer 28b, relative to the total weight of the first polymer 28a and the second polymer 28b.

Figure 4:
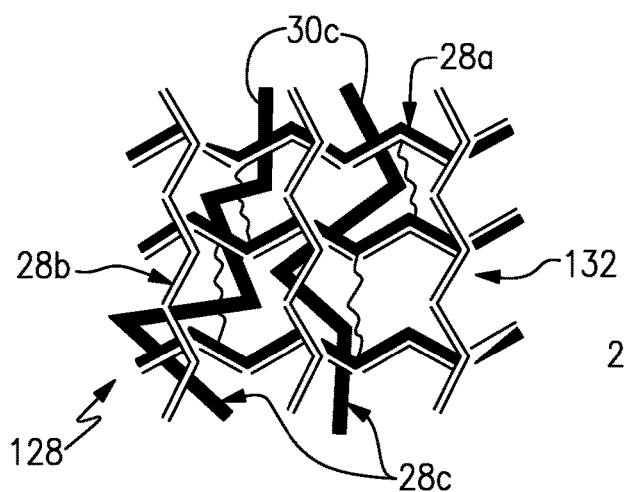
FIG. 4 is a molecular view of another example binder material that has a ternary polymer network.

The example of the binder material 28 in FIG. 3 with the first polymer 28a and the second polymer 28b is a binary polymer binder system. FIG. 4 shows another example binder material 128 that is a ternary polymer binder system that includes a third polymer 28c, in addition to the first polymer 28a and the second polymer 28b. The third polymer 28c has third polymer chains 30c that can be linear, branched, or cross-linked chains. For example, the third polymer 28c can include any of the above example carbon-backbone polymers or silicon-backbone polymers and is different in composition from the first polymer 28a and the second polymer 28b.

The third polymer chains 30c are also intertwined on a molecular scale in an interpenetrating network 132 with the cross-linked first polymer chains 30a. Similar to the interpenetrating network 32, the interpenetrating network 132 can be a fully-interpenetrating network or a semi-interpenetrating network, depending on the types of the second polymer chains 30b and the third polymer chains 30c with respect to being linear, branched, or cross-linked.

The chemical composition of the third polymer 28c is different than the first polymer 28a and the second polymer 28b and can also be selected to enhance and tailor the strength, adhesion, and chemical resistance of the coating 24. For example, the third polymer 28c includes a different carbon-backbone polymer or a different silicon-backbone polymer than the first polymer 28a and the second polymer 28b, respectively. In one example, the first polymer 28a and the third polymer 28c include different thermoset polymers and the second polymer 28b includes polysiloxane. In a further example, the thermoset polymers are polyurethane and epoxy.

In another example, the binder material 28 is, or includes, a silicate-based material that derives from water glass. Water glass can include one or more oxide compounds of silicon, sodium, potassium, and lithium, and optionally one or more co-binder compounds that include aluminum phosphate and boron, dissolved in water. The water glass, once cured, produces a silicate material as, or in, the binder material 28.

In one example, the silicate material has a controlled weight ratio of the silicate constituents. For instance, the silicate material has a weight ratio of $SiO_2:Na_2O$ that is 4.0:3.2, 5.2:2.4, or 5.0:2.0. In further examples, if used, the amount of the co-binder compounds in the total amount of the silicate material is 3% to 40%, but more typically is 10% to 30%.

In a further example, the water glass, and thus the silicate material in the coating 24, also includes an inorganic clay. The inorganic clay may further enhance mechanical properties of the coating 24, and may serve to reduce roughness in the final translucent enamel coating and enhance adhesion with the glass substrate 22. In one example the coating 24 includes, by weight, an amount of the inorganic clay such that the final translucent enamel coating contains approximately 0.1% to approximately 10% of the inorganic clay, but more typically the final translucent enamel coating may include 0.2% to 8%. Generally, higher amounts of the inorganic clay in the given range may tend to increase haze in the final translucent enamel coating.

In one further example, the binder material 28, or portion thereof, produced from the water glass has a composition as set forth in Table 2 below. The listed constituents may vary by +/−10% of the listed values. For example, a value of 2.72 could vary by +/−0.272.

TABLE 2

Binder Material Composition From Water Based Glass

| Element | wt. % |
|---|---|
| $B_2O_3$ | 2.72 |
| F | 0.19 |
| $Na_2O$ | 0.24 |
| $Al_2O_3$ | 0.039 |
| $SiO_2$ | 96.27 |
| $P_2O_3$ | 0.05 |
| $SO_3$ | 0.41 |
| Cl | 0.022 |
| $K_2O$ | 0.003 |
| CaO | 0.02 |
| $TiO_2$ | 0.016 |
| $Fe_2O_3$ | 0.006 |
| NiO | 0.004 |
| CuO | 0.001 |
| ZnO | 0.004 |
| $ZrO_2$ | 0.008 |

Figure 5A:
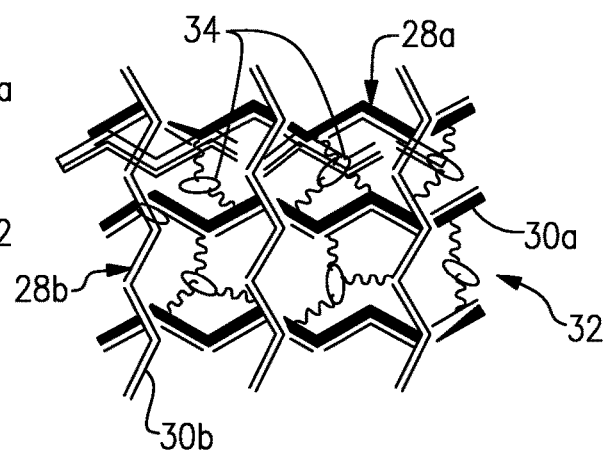
FIG. 5A is a molecular view of an example binder material that has a binary polymer network with nanoparticles.
Figure 5B:
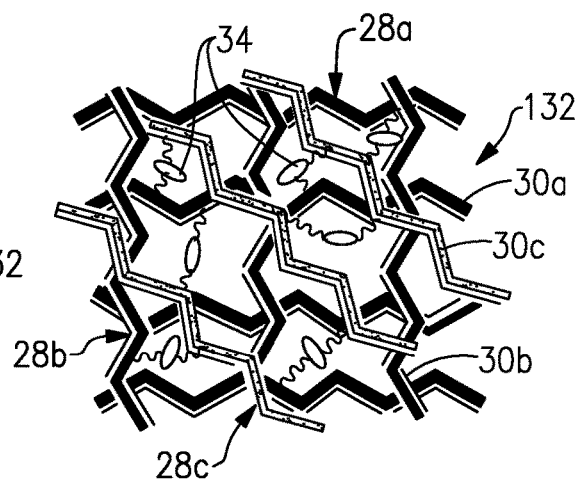
FIG. 5B is a molecular view of an example binder material that has a ternary polymer network with nanoparticles.

In further examples shown in FIGS. 5A and 5B, the strength, adhesion, and chemical resistance of the coating 24 can be further enhanced with the inclusion of nanoparticles 34. In one example, the nanoparticles 34 are silicon-containing nanoparticles. An example of silicon-containing nanoparticles includes silica ($SiO_2$) nanoparticles.

The nanoparticles 34 generally have a maximum length of less than 1000 nanometers, but more typically have a maximum length of less than 500 nanometers. In one further example, the maximum length is in a range of approximately 5 nanometers to approximately 120 nanometers, to facilitate the promotion of chemical bonding.

As shown, the nanoparticles 34, and in particular silica nanoparticles, may be chemically bonded with one or more of the polymer chains 30a/30b/30c in the interpenetrating network 32/132. The nanoparticles 34 thus serve as nodes for attachment to one or more of the polymer chains 30a/30b/30c to increase cross-link density, further strengthen the binder material 28/128, enhance chemical resistance, and even enhance adhesion by chemically bonding with the glass substrate 22.

The good strength, adhesion, and chemical resistance of the binder material 28/128 permit the coating 24 to contain a relatively low amount of the binder material 28/128 in comparison to some binders that contain only a linear polymers or binders that do not have an interpenetrating network. In turn, the low amount of the binder material 28/128 facilitates clean thermal removal of the binder material 28/128, with little or no residual char that might otherwise debit optical performance.

The total weight of the coating 24 can include less than 11% of the binder material 28/128, inclusive of the nanoparticles 34, if used. In a further example, the coating 24 includes 0.5% to 5% of the nanoparticles 34 and less than 11% of the binder material inclusive of the nanoparticles 34. The remainder of the composition of the coating may be the glass frit material 26 and any additives that are used, such as pigments.

A potential lower bound of the amount of binder material 28/128 in the coating 24 is approximately 7%, below which the strength, adhesion, and/or chemical resistance may diminish. Amounts lower than 7%, such as approximately 5% or approximately 3%, can be used if the strength, adhesion, and/or chemical resistance is acceptable for a given implementation.

Amounts of the binder material 28/128 in the coating 24 that are higher than 11% may potentially also be used. However, there may be a diminishing return on the benefits to strength, adhesion, and/or chemical resistance in the coating 24. Amounts over 11% also increase the potential for residual char after thermal removal of the binder material 28/128, and thus also increase the potential of debiting optical performance. In particular, thermoset cross-linked polymers and polysiloxane are generally thermally resistant and high amounts of these polymers may increase the potential for residual char in the final translucent enamel coating.

Figure 6:
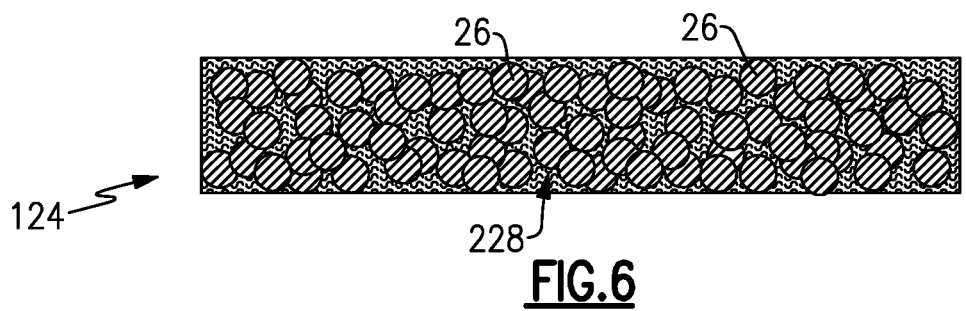
FIG. 6 is a sectioned view of another example coating for a glass article.

FIG. 6 illustrates a representative portion of another example of a coating 124 that could alternatively be used on the glass substrate 22 in the glass article 20. In this example, the coating 124 includes the glass frit material 26 and, by weight, less than 11% of a binder material 228. The binder material 228 provides the coating 124 with good strength, adhesion to the glass substrate 22, and chemical resistance. For example, the coating 124 has a cross-hatch adhesion of greater than or equal to 3 B (ASTM: D3359-09), a stud pull strength of greater than or equal to 450 pounds per square inch (ASTM: D4435-84), a Hoffman hardness of greater than 10 (GE: E50TF65), and a methyl-ethyl-ketone (MEK) rub resistance of greater than 100 strokes (ASTM: D4752). In further examples, the cross-hatch adhesion may be 5 B, the stud pull strength may be greater than 500 pounds per inch or greater than 600 pounds per inch, and the Hoffman hardness may be greater than 15 or greater than 20.

The binder material 228 can include any polymer binder system that meets the above properties, at the weight of less than 11%, for cross-hatch adhesion, stud pull strength, Hoffman hardness, and MEK rub resistance. In one example, the binder material 228 may include a single polymer binder system or a binary or higher polymer binder system, as long as the selected binder system provides the above properties for the coating 124. In one example, the binder material 228 includes the nanoparticles 34 described herein, in either a single polymer binder system or a binary or higher polymer binder system. An example single polymer binder system may include a silicon-backbone polymer. Example binary or higher polymer binder systems may include an interpenetrating network or may include either of the binder materials 28 or 128 with the interpenetrating network 32 or 132, respectively.

In further examples, many linear polymers cannot meet the above properties, at the weight of less than 11%, for cross-hatch adhesion, stud pull strength, Hoffman hardness, and MEK rub resistance. In some examples, the binder material 228 may at least include the nanoparticles 34 and/or a binary or higher polymer binder system wherein one of the polymers is either a silicon-backbone polymer or a cross-linked polymer. Use of a silicon-backbone polymer and a cross-linked polymer in a binary or higher polymer binder system may tend to shift the above properties higher. Use of a ternary polymer binder system with a silicon-backbone polymer and two cross-linked polymers, in an interpenetrating network, may tend to shift the above properties even higher.

Figure 7:
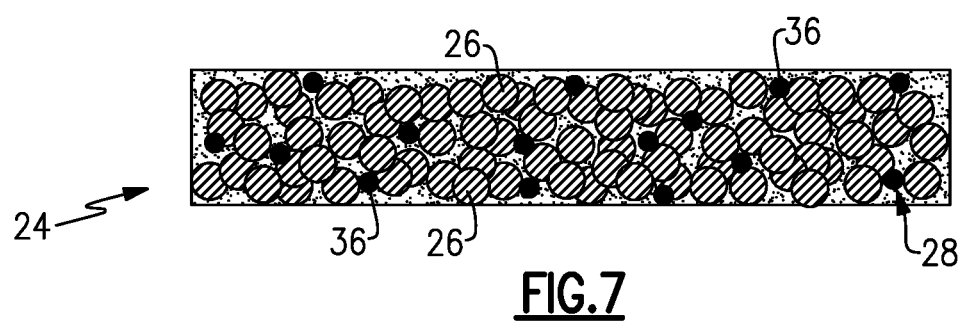
FIG. 7 is another example of a coating that has a self-cleaning additive.

Any of the examples of the coating 24/124 herein, or even other types of coatings for forming translucent enamels, may include additional constituents for enhancing coating performance FIG. 7 shows a further example of the coating 24 (or coating 124) with one such enhancement. In this example, the coating 24 additionally includes a self-cleaning additive 36. For instance, the self-cleaning additive 36 includes titanium-containing nanoparticles. The titanium-containing nanoparticles generally have a maximum length of less than 1000 nanometers, but more typically will have a maximum length of less than 500 nanometers. In one further example, the maximum length is in a range of approximately 1 nanometer to approximately 10 nanometers, to facilitate photocatalytic activity.

In a further example, the titanium-containing nanoparticles include the anatase crystal structure of titania. In this regard, the nanoparticles may include anatase titania nanoparticles, such as in a mixture of anatase titania nanoparticles and rutile titania nanoparticles, a mixture with predominantly anatase titania nanoparticles, or a mixture with only anatase titania nanoparticles.

A self-cleaning action of the titanium-containing nanoparticles derives from photocatalytic activity of titania at the free surface or near-surface region of the final translucent enamel coating formed from the coating 24 after heat treatment. Titania is photocatalytically active with ultraviolet radiation. The titania decomposes organic materials in the presence of ultraviolet radiation to thus facilitate removal of organic materials from the surface of the final translucent enamel coating.

The amount of titanium-containing nanoparticles, by weight, in the coating 24 (and eventually in the final translucent enamel coating) can be selected with regard to a balance between the self-cleaning effect and a potential debit to optical properties of the final translucent enamel coating. In general, the amount of titanium-containing nanoparticles in the coating 24 will be, by weight, in a range of approximately 0.2% to approximately 5%.

Figure 8:
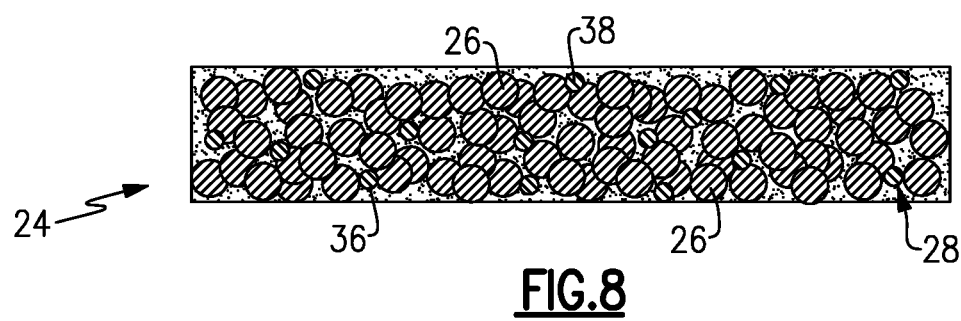
FIG. 8 is another example of a coating that has a pigment.

FIG. 8 shows a further example of the coating 24 (or coating 124) with another enhancement constituent. In this example, the coating 24 additionally includes a pigment 38. The pigment 38 can include a single pigment or multiple pigments to produce a desired color effect. The pigment 38 does not burn out during the heat treatment to produce the final translucent enamel coating. In general, the amount of pigment 38, by weight relative to the total weight of the pigment 38 and the glass frit material 26 in the coating 24, is 0.1% to 15%, and more typically is 0.5% to 10%.

In a further example, the pigment 38 includes pigment particles that have a relatively high aspect ratio, such as silica pigment particles with a sheet- or plate-like geometry. The pigment particles produce a multi-color effect in the final translucent enamel coating such that the visible color or color shade changes as the angle of viewing changes.

Figure 9:
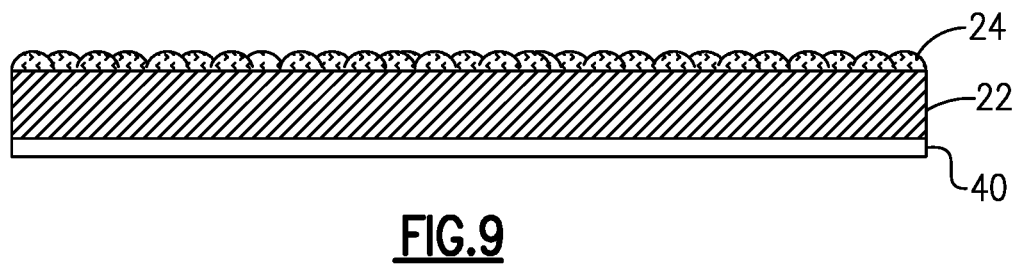
FIG. 9 is an example of a glass article that has a low-E coating.

FIG. 9 shows a further example of the glass article 20 with the glass substrate 22 and the coating 24 (or coating 124). In this example, the glass substrate 22 additionally includes a low-E coating 40. The type and composition of the low-E coating 40 are not limited. Low-E coatings are generally known and are thus not described in further detail herein.

Figure 10:
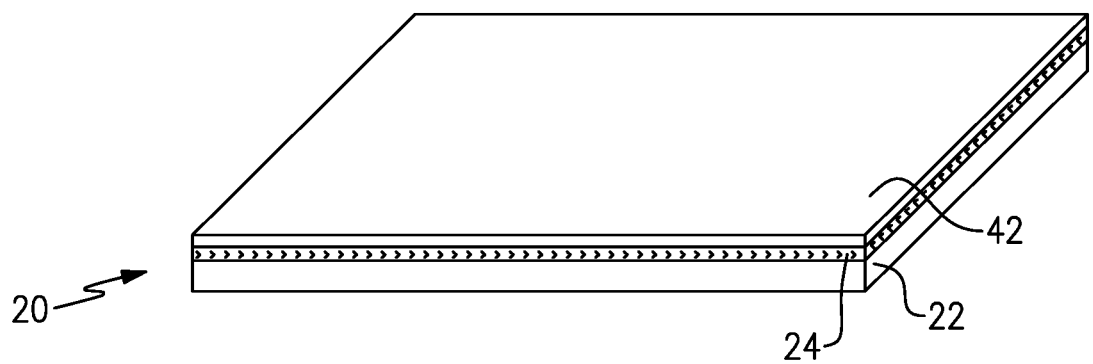
FIG. 10 is an example of a glass article that has a coating and a protective film.

FIG. 10 shows a further example of the glass article 20 with the glass substrate 22 and the coating 24 (or coating 124). In this example, the glass article 20 additionally includes a protective film 42 disposed on the coating 24. For example, the protective film 42 is a substantially glass frit-free polymeric layer. The protective film 42 can include one or more polymers that are selected for strength, hardness, chemical resistance, and processability. One example polymer includes, but is not limited to, a styrene-acrylic polymer. The styrene-acrylic polymer can be burned off cleanly during heat treatment, leaving little or no char that could potentially debit optical properties of the final translucent enamel coating.

The protective film 42 serves to shield the underlying coating 24 from mechanical damage and/or chemical exposure. Such a protective film 42 could also be used with other coatings for forming translucent enamel coatings. In particular, other coatings that do not have the interpenetrating network 32/132 may be susceptible to mechanical damage and/or chemical attack, and thus the protective film 42 may be used as a measure of shielding such a coating.

The coating 24/124, and potentially other coatings for forming translucent enamel coatings, can be fabricated using a wet deposition process. Such a process can include applying a liquid coating material onto a glass substrate. The liquid coating material includes a carrier liquid, a glass frit material (e.g., the glass frit material 26), and a binder material (e.g., the binder material 28/128/228), but may also include additives, such as the self-cleaning additive 36, the pigment 38, or other additives. The technique used for applying the liquid coating material can include, but is not limited to, roller application, spray application, or curtain application.

The carrier liquid includes a solvent, such as water or one or more organic solvents. Where there are handling, environmental, or cost considerations, water may be used rather than organic solvents. Water generally has lower organic volatiles, is easier to handle, and is lower in cost than many organic solvents.

One example of use of a water-based carrier liquid for the liquid coating material is a polymer latex. A polymer latex is an emulsion solution of one or more polymers, oligomers, and/or monomers suspended in an aqueous medium. For instance, the polymer latex can include the polymers, oligomers, and/or monomers for producing the polymers of the binder material 28/128 disclosed herein.

Another example of use of a water-based carrier liquid for the liquid coating material is water glass. In this example, the liquid coating material includes water, a glass frit material (e.g., the glass frit material 26), and the silicate-based binder material disclosed herein (and optionally the co-binder).

After application of the liquid coating material onto the glass substrate, the process further includes removing at least a portion of the carrier liquid and reacting the binder material to form the coating on the glass substrate. The removing and the reacting may proceed concurrently by heating the liquid coating material while on the glass substrate. In one example for producing the coating 24 described herein (or coating 124), the removal of the carrier liquid and the reaction of the binder material is conducted at approximately 150° C.-280° C., for approximately 10-30 minutes. In further examples, multiple hold-temperatures may be used for the removal of the carrier liquid and the reaction of the binder material. If used, the protective film 42 can subsequently be applied on the coating, such as by using a similar wet processing technique.

For water glass, the removal of the carrier liquid and the reaction of the binder material may be conducted using multiple hold-temperatures, to reduce the potential for gas entrapment and porosity in the coating due to bubbling in the water glass. For example, a first temperature of approximately 95° C., for approximately 10 minutes, is used to partially cross-link the silicate-based binder material and remove a portion of the water. A second temperature of approximately 150° C.-280° C., for approximately 10-30 minutes, is then used to further cross-link the binder material and remove more of the water. The use of multiple hold-temperatures thus more gradually removes the water and reacts the binder material.

In one further example based on water glass, polymer particles are added to the liquid coating material to further reduce the potential for gas entrapment during the heating. For instance, the polymer particles can include, but are not limited to, cross-linked polystyrene, polyacrylic, polymethyl methylacrylate, and related copolymers. The size of the polymer particles may be from approximately 1 micrometer to approximately 10 micrometers. The amount of the polymer particles, by weight, in the liquid coating material may be from approximately 0.2% to 3%, but more typically may be approximately 0.5% to 1.5%.

After removal of the carrier liquid to form the coating, the glass article is heat treated in a tempering process to remove the binder material, sinter the glass frit material to produce the final translucent enamel coating, and temper the glass substrate. Typically, such a heat treatment will be conducted by a purchaser or other downstream user of the glass article. Prior to the heat treatment, the glass article may be cut or otherwise processed in preparation for a desired end use.

The selected heat treatment temperature is typically high enough to burn off the binder material and sinter the glass frit, yet is low enough to avoid or reduce the potential for violent gas evolution that could produce porosity or defects in the final translucent enamel coating. In one example for producing the coating 24, the heat treatment is conducted at approximately 680° C., for approximately 14 minutes. The use of linear or branched polymers for the second polymer 28b and/or third polymer 28c can also facilitate clean removal of the binder material 28/128, or at least a portion thereof.

Although a combination of features is shown in the examples herein, not all of them need to be combined to realize the benefits of various embodiments of this disclosure. In other words, a system designed according to an embodiment of this disclosure will not necessarily include all of the features shown in any one of the figures. Moreover, selected features of one example embodiment may be combined with selected features of other example embodiments.

The preceding description is non-limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A glass article comprising:
a glass substrate;
a coating disposed on the glass substrate, the coating including a glass frit material and a binder material, the binder material comprising a first polymer having cross-linked first polymer chains and a second polymer having second polymer chains that are linear, branched, or cross-linked, and the cross-linked first polymer chains and the second polymer chains forming an interpenetrating network in which the second polymer chains are intertwined with the cross-linked first polymer chains and further wherein the coating includes less than 11% of the binder material relative to a total weight of the coating; and
wherein the coating is chemically bonded to the glass substrate.

2. The glass article of claim 1, wherein the coating includes at least 89% of the glass frit relative to a total weight of the coating.

3. The glass article as recited in claim 1, wherein the first polymer includes a carbon-backbone polymer and the second polymer includes a silicon-backbone polymer.

4. The glass article as recited in claim 3, wherein the silicon-backbone polymer includes polysiloxane.

5. The glass article as recited in claim 4, wherein the carbon-backbone polymer includes a thermoset polymer.

6. The glass article as recited in claim 4, wherein the carbon-backbone polymer includes polyurethane or epoxy.

7. The glass article as recited in claim 3, wherein the silicon-backbone polymer includes polysilsesquioxane.

8. The glass article as recited in claim 1, wherein the second polymer chains are cross-linked.

9. The glass article as recited in claim 1, wherein the coating further comprises a third polymer having third polymer chains that are either linear, branched, or cross-linked, and the third polymer chains are also intertwined in the interpenetrating network with the cross-linked first polymer chains.

10. The glass article as recited in claim 9, wherein the third polymer includes a thermoset polymer.

11. The glass article as recited in claim 1, wherein the coating further comprises nanoparticles.

12. The glass article as recited in claim 11, wherein the nanoparticles include silicon-containing nanoparticles, and relative to a total weight of the coating, the coating includes 0.5% to 5% of the silicon-containing nanoparticles and less than 11% of the binder material inclusive of the silicon-containing nanoparticles.

13. The glass article as recited in claim 12, wherein the silicon-containing nanoparticles are chemically bonded with at least one of the first polymer chains or the second polymer chains.

14. The glass article as recited in claim 11, wherein the nanoparticles include titanium-containing nanoparticles.

15. The glass article as recited in claim 1, further comprising a substantially glass frit-free polymeric layer disposed on the coating.

16. The glass article as recited in claim 1, wherein the coating further comprises a pigment.

17. The glass article as recited in claim 1, wherein the glass substrate includes a low-E coating.

* * * * *